United States Patent
Lee et al.

(10) Patent No.: US 9,460,338 B2
(45) Date of Patent: Oct. 4, 2016

(54) FACE DETECTION METHOD AND APPARATUS WITH LOOKUP TABLE

(71) Applicant: Intel Corporation, Santa Clara, CA (US)

(72) Inventors: Jinwook Lee, Seoul (KR); Bongjin Jun, Gyeongbuk (KR); Tae-Hoon Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/566,312

(22) Filed: Dec. 10, 2014

(65) Prior Publication Data

US 2016/0171286 A1  Jun. 16, 2016

(51) Int. Cl.
*G06T 7/00* (2006.01)
*G06K 9/00* (2006.01)

(52) U.S. Cl.
CPC .......... *G06K 9/00275* (2013.01); *G06T 7/003* (2013.01); *G06T 2207/10004* (2013.01); *G06T 2207/30201* (2013.01)

(58) Field of Classification Search
None
See application file for complete search history.

(56) References Cited

U.S. PATENT DOCUMENTS

| 2005/0039053 | A1 | 2/2005 | Walia |
| 2011/0216948 | A1 | 9/2011 | Yalla et al. |
| 2012/0221606 | A1 | 8/2012 | Alvarez et al. |
| 2014/0286527 | A1* | 9/2014 | Harthattu ........... G06K 9/00228 382/103 |
| 2015/0058579 | A1* | 2/2015 | Xu ..................... G06K 9/00973 711/141 |

FOREIGN PATENT DOCUMENTS

| EP | 2804144 A1 | 11/2014 |
| WO | WO 99-36880 A1 | 7/1999 |

OTHER PUBLICATIONS

Jun et al., "Robust face detection using local gradient patters and evidence accumulation," Mar. 21, 2012, pp. 3304-3316, www.elsevier.com/locate/pr, Korea.
International Search Report an Written Opinion mailed Feb. 23, 2016 for International Application No. PCT/US2015/059736, 15 pages.

* cited by examiner

*Primary Examiner* — Stephen R Koziol
*Assistant Examiner* — Delomia L Gilliard
(74) *Attorney, Agent, or Firm* — Schwabe, Williamson & Wyatt, P.C.

(57) ABSTRACT

Apparatuses, methods and storage medium associated with face detection are disclosed. In embodiments, an apparatus may comprise one or more processors, cache memory, a lookup table of feature patterns, and a face detector. The lookup table is to be loaded into the cache memory, during operation, for use to detect whether a face is present in an image. The feature patterns within the lookup table are organized within the lookup table in accordance with relative connectivity of the feature patterns. The face detector to detect whether a face is present in an image, may use the lookup table of feature patterns loaded into the cache memory during detection for the face. Other embodiments may be described and/or claimed.

22 Claims, 5 Drawing Sheets

FACE DETECTION METHOD AND APPARATUS WITH LOOKUP TABLE

TECHNICAL FIELD

The present disclosure relates to the field of computing. More particularly, the present disclosure relates to face detection in an image, employing an efficiently organized lookup table.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Face detection is widely employed in many applications. Most face detection techniques involve a large number of random accesses of a look-up table (LUT) that maps a pattern of its feature to a score value for the pattern to represent a part of the face. Due to the complexity of face detection, the LUT is often too big to be fully fitted into the cache memory of many client computing devices, such as smartphones, computing tablets, and so forth. Thus, on these client computing devices, cache misses occur frequently on the devices during face detection, and as a result, face detection is often not completed as fast as it is desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with face detection are disclosed. In embodiments, an apparatus may comprise one or more processors, cache memory, a lookup table of feature patterns, and a face detector. The lookup table is to be loaded into the cache memory, during operation, for use to detect whether a face is present in an image. The feature patterns within the lookup table are organized within the lookup table in accordance with relative connectivity of the feature patterns. The face detector to detect whether a face is present in an image, may use the lookup table of feature patterns loaded into the cache memory during detection for the face.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
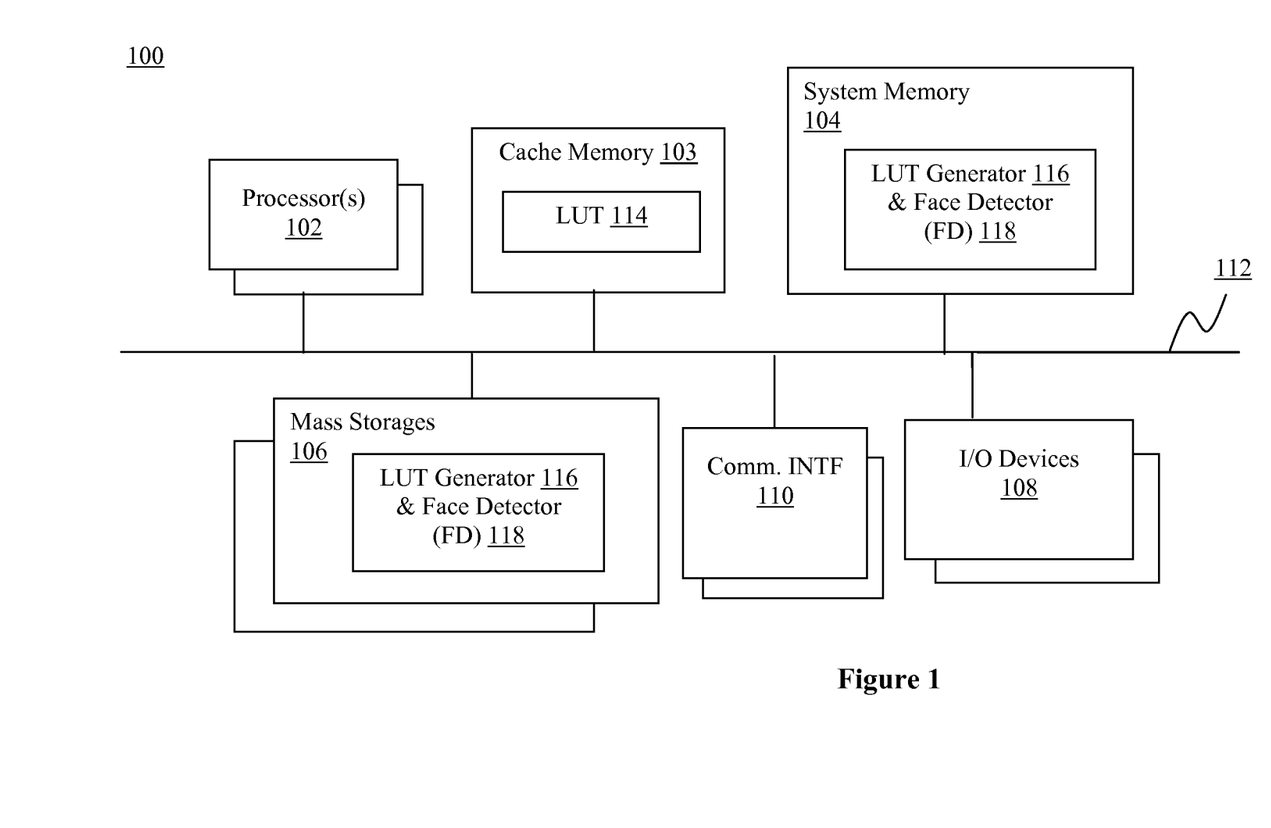
FIG. 1 illustrates an example computing system incorporated with the face detection teachings of the present disclosure, according to various embodiments.

Referring now to FIG. 1, wherein an example computing system incorporated with the face detection teachings of the present disclosure, according to various embodiments, is shown. As illustrated, computing system 100 may include one or more processors 102, cache memory 103, and system memory 104. Each processor 102 may include one or more processor cores. Cache memory 103 may include LUT 114, and system memory 104 may include a non-persistent copy of LUT generator 116 and face detector (FD) 118. In embodiments, cache memory 103 may be part of processors 102. LUT 114 may be configured to include a number of feature patterns usable for detecting whether a face is present in an image. LUT generator 116 may be configured to generate LUT 114. FD 118 may be configured to detect whether a face is present in an image, based on the feature patterns pre-stored in LUT 114, accessing LUT 114 repeatedly in the course of determining whether a face is present in an image frame. Further, as will be described in more detail below, LUT generator 116 may be configured to generate LUT 114 that is efficiently organized in accordance with the relative connectivity of the feature patterns. As a result, face detection may be efficiently performed by FD 118, even in smaller client devices with relatively small cache memory 103 (such as smartphones, computing tablets, and so forth). In embodiments, system memory 104 may further include non-persistent copies of an operating system and/or various other applications (not shown). Before further describing LUT generator 116 and FD 118, it should be noted that while LUT 114, its organization, generation, usage and so forth are designed to facilitate efficient operation on client computing devices with relatively smaller cache memory (as compared to laptops, desktops, or servers), however, it is anticipated LUT 114, its organization, generation, usage and so forth, as disclosed, may be practiced on computing devices with larger cache memory (such as, laptops, desktops, and/or servers.)

Still referring to FIG. 1, computing system 100 may further include mass storage devices 106, input/output devices 108, and communication interfaces 110. Mass storage devices 106 may include a persistent copy of LUT generator 116 and FD 118. The elements 102-110 may be coupled to each other via system bus 112, which may represent one or more buses. In the case of multiple buses, they may be bridged by one or more bus bridges (not shown). Examples of mass storage devices 106 may include, but are not limited to, diskettes, hard drives, compact disc read only memory (CD-ROM) and so forth. Examples of input/output devices 108 may include, but are not limited to, displays, keyboards, cursor controls and so forth. Examples of communication interfaces 110 may include, but are not limited to, wired and/or wireless network interface cards, modems and so forth. Communication interfaces 110 may support a variety of wired or wireless communications including, but are not limited, 3G/4G/5G, WiFi, Bluetooth®, Ethernet, and so forth.

Except for LUT 114, LUT generator 116 and FD 118, each of these elements 102-110 may perform its conventional functions known in the art. The number, capability and/or capacity of these elements 102-110 may vary, depending on whether computing system 100 is used as a client device or a server. When used as a client device, the capability and/or capacity of these elements 102-110 may vary, depending on whether the client device is a stationary or mobile device, like a wearable device, a smartphone, a computing tablet, an ultrabook or laptop. Otherwise, the constitutions of elements 102-110 are known, and accordingly will not be further described.

Figure 2:
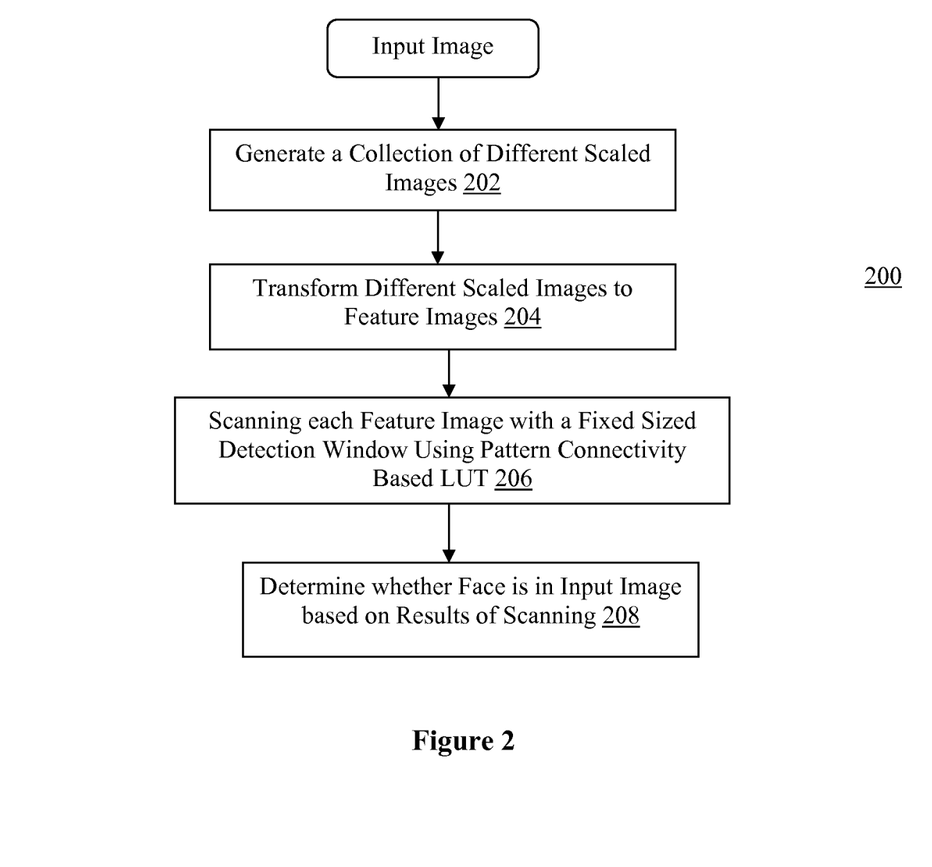
FIG. 2 illustrates an example process for face detection, according to various embodiments

Referring now to FIG. 2, wherein an example process for face detection, according to various embodiments, is shown. As illustrated, process 200 for face detection may include operations performed in blocks 202-208. The operations may be performed e.g., by FD 118 of FIG. 1. In other embodiments, process 200 may be performed without some of the operations, with additional operations and/or with different orders of the operations.

As shown, process 200 may start at block 202. At block 202, on receipt of an image, a collection of different scaled images may be generated. In embodiments, the collection of different scaled images may be generated via the pyramid technique.

At block 204, the different scaled images may be transformed into different scaled feature images. In embodiments, the different scaled images may be transformed into different scaled modified census transform (MCT) images. In other embodiments, the different scaled images may be transformed into different scaled local binary pattern (LBP) images.

At block 206, each feature image may be scanned with a detection window to detect whether a face is present within the detection window. In embodiments, the detection window may be fixed sized. Further, a cascade of face classifiers may be applied to each detection window to determine whether a face is present within the detection window. Each classifier may be pre-trained e.g., using the AdaBoost learning method. In embodiments, for efficiency of operation, each classifier may be applied using the feature patterns pre-stored in a LUT disposed in a cache memory. In particular, the feature patterns may be pre-stored in the cache resident LUT that is efficiently organized based on the relative connectivity of the feature patterns. In embodiments, the relative connectivity of the feature patterns may be measured by a scoring function that scores the likelihood of one feature pattern will be followed by another feature pattern, in the course of analyzing an image to detect for a face. An example scoring function is a probability function that provides the conditional probability of encountering feature pattern A immediately after encountering feature B, $P\{A|B\}$.

At block 208, a determination may be made as to whether a face is present in the image, based at least in part on the results of the scanning at block 206.

Figure 3:
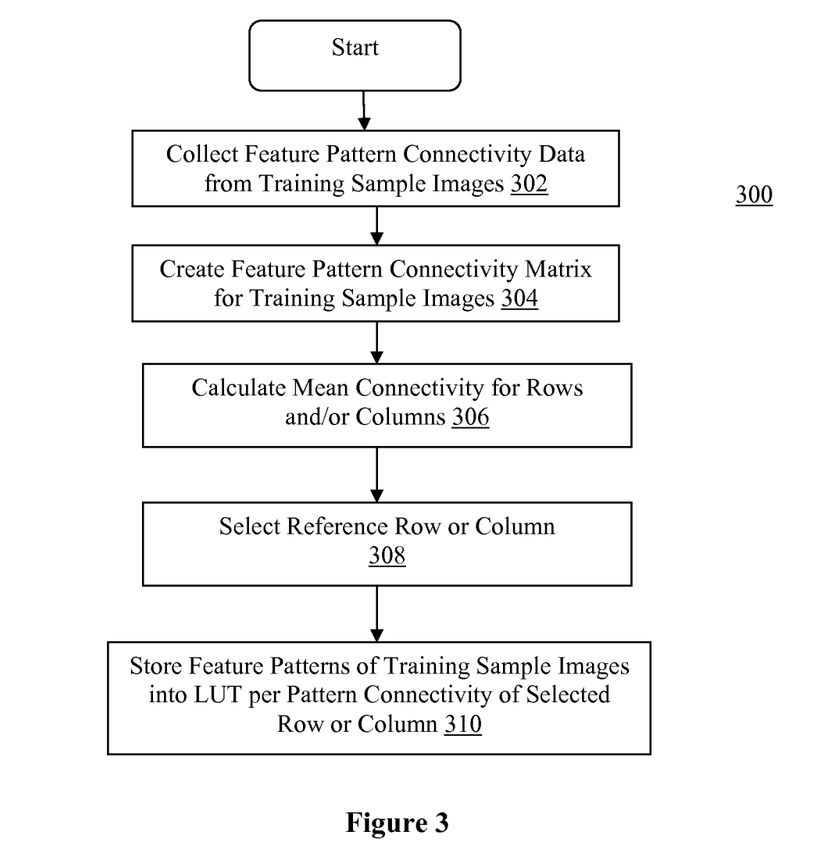
FIGS. 3-4 illustrate an example process for generating an efficient LUT for use for face detection, according to the various embodiments.
Figure 4:
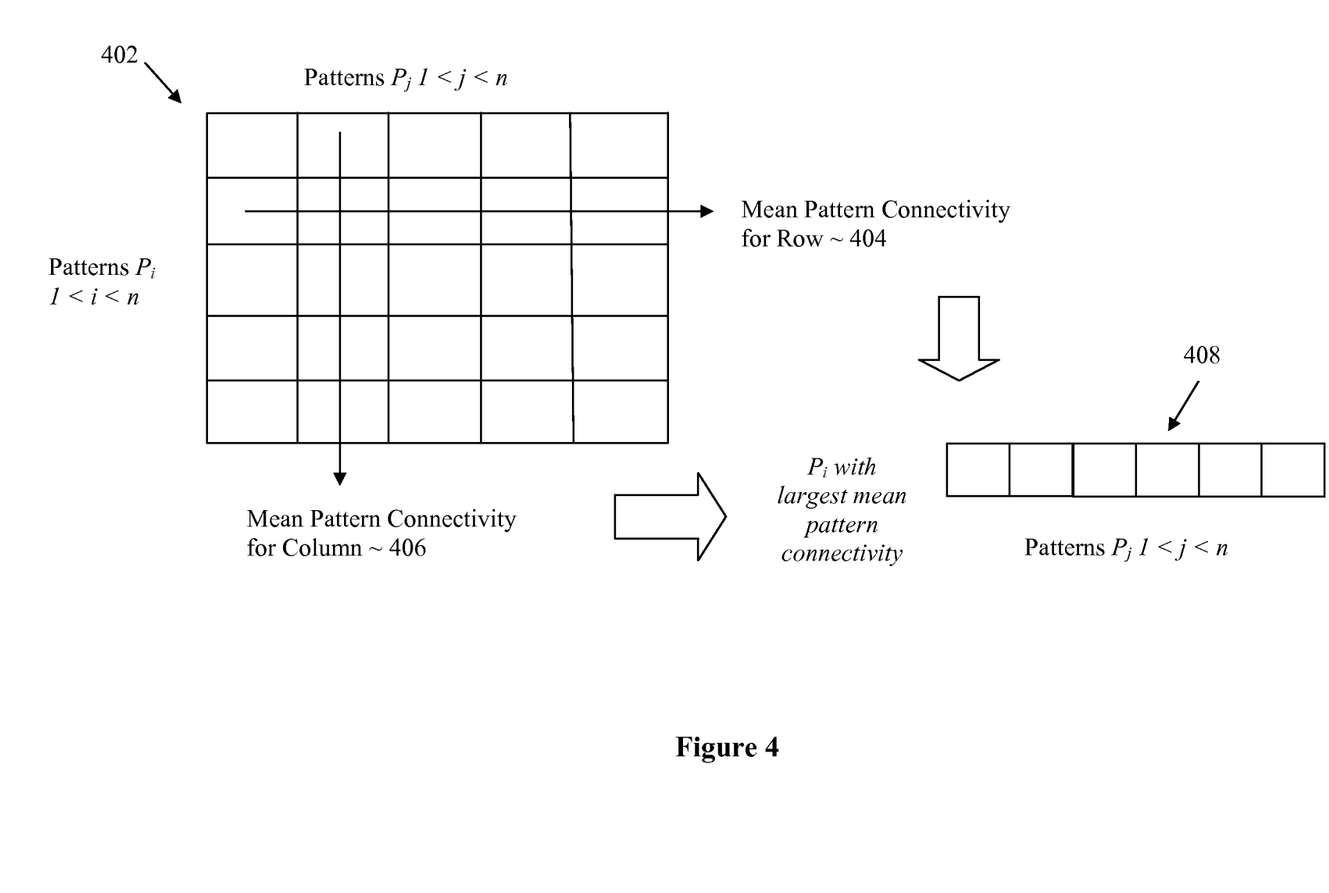

Referring now to FIGS. 3-4, wherein an example process for generating an efficient LUT for face detection, according to various embodiments, is shown. As illustrated, process 300 for generating an efficiently organized LUT for face detection may include operations performed in blocks 302-310. The operations may be performed e.g., by LUT generator 116 of FIG. 1. In other embodiments, process 300 may be performed without some of the operations, with additional operations and/or with different orders of the operations.

Process 300 may start at block 302. At block 302, feature pattern connectivity data may be collected from training sample images. In embodiments, as described earlier, feature pattern connectivity data may be measured in terms of the score a feature pattern will be followed by another feature pattern in the course of analyzing an image to detect for a face. In embodiments, feature pattern connectivity data may be collected from 100,000 training sample images.

At block 304, the feature pattern connectivity data (e.g., the scores or probabilities) collected may be organized into a feature pattern connectivity table or matrix 402.

At block 306, the mean connectivity (e.g., the average score or probability) of a row 404 or a column 406 may be calculated.

At block 308, the row or column with the largest mean connectivity (e.g., the average score or probability) may be selected as the reference row or column 408.

At block 310, the feature patterns of the training sample images may be stored into the LUT per their relative connectivity of the selected reference row or column.

As will be appreciated by one skilled in the art, for MCT feature of 9-bit patterns, table or matrix 402 has a size of 512×512, thus process 300 provides an efficient approach in locating an efficiently organized LUT 114 to be disposed in cache memory for use during face detection that reduces the likelihood of cache misses. Those skilled in the art will so recognize because had all permutations been considered to select the most optimal LUT, 2×620!×512! permutations would have to be considered, if we consider 620 validating points and also the transpose of the LUT. Even, if the validating points are not considered, 2×512! permutations still have to be considered, if transpose of the LUT is considered.

Figure 5:
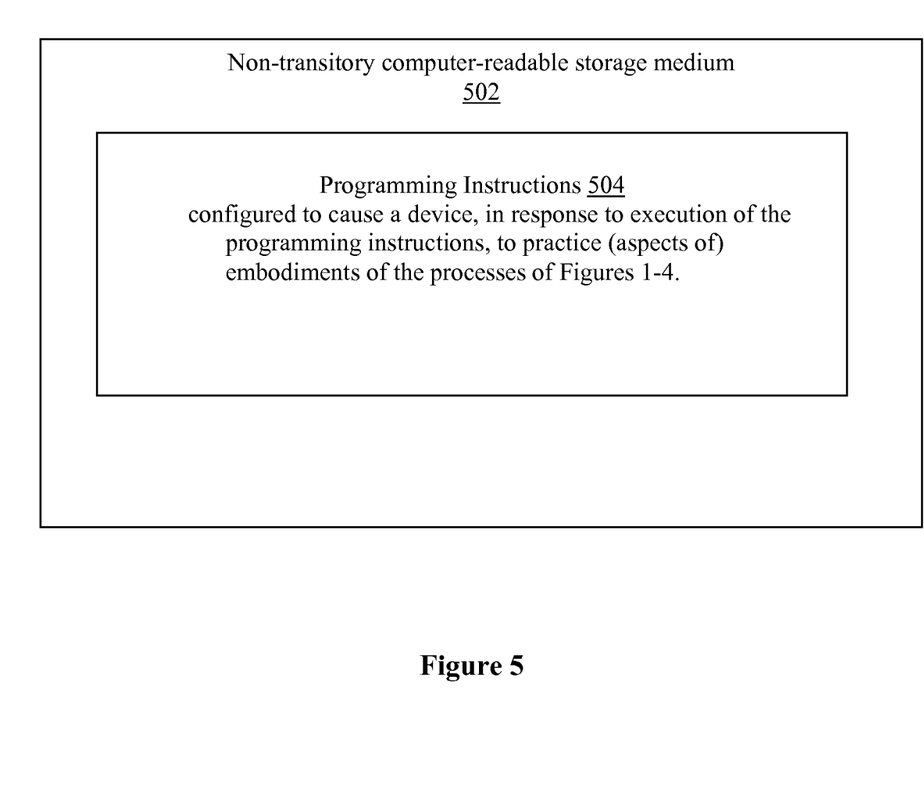
FIG. 5 illustrates a storage medium having instructions for practicing methods described with references to FIGS. 1-4, according to disclosed embodiments.

The present disclosure may be embodied as methods or computer program products. Accordingly, the present disclosure, in addition to being embodied in hardware as earlier described, may take the form of an entirely software embodiment (including firmware, resident software, microcode, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 502 may include a number of programming instructions 504. Programming instructions 504 may be configured to enable a device, e.g., computing system 100, in response to execution of the programming instructions, to perform, e.g., various operations associated with LUT generator 116, FD 118 of FIG. 1, process 200 and/or process 300 of FIGS. 2-4. In alternate embodiments, programming instructions 504 may be disposed on multiple computer-readable non-transitory storage media 502 instead. In alternate embodiments, programming instructions 504 may be disposed on computer-readable transitory storage media 502, such as, signals.

Any combination of one or more computer-usable or computer-readable medium(s) may be utilized. The computer-usable or computer-readable medium may be, for example but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computing system and encoding a computer program instructions for executing a computer process.

The corresponding structures, materials, acts, and equivalents of all means or steps plus function elements in the claims below are intended to include any structure, material or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 1, for one embodiment, at least one of processors 102 may be packaged together with memory having LUT generator 116 and/or FD 118. For one embodiment, at least one of processors 102 may be packaged together with memory having LUT generator 116 and/or FD 118 to form a System in Package (SiP). For one embodiment, at least one of processors 102 may be integrated on the same die with memory having LUT generator 116 and/or FD 118. For one embodiment, at least one of processors 102 may be packaged together with memory having LUT generator 116 and/or FD 118 to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, including detecting a face in an image. The apparatus may comprise: one or more processors; cache memory; and a lookup table of feature patterns to be loaded into the cache memory, during operation, for use to detect whether a face is present in an image. The feature patterns within the lookup table may be organized within the lookup table in accordance with relative connectivity of the feature patterns. The apparatus may further include a face detector to be operated by the one or more processors to detect whether a face is present in an image, that uses the lookup table of feature patterns loaded into the cache memory during detection for the face.

Example 2 may be example 1, wherein relative connectivity of a first and a second feature pattern of the feature patterns may be measured by a score indicative of a likelihood of the first feature pattern is followed by the second feature pattern when analyzing an image to detect a face.

Example 3 may be example 1, further comprising a lookup table generator to generate the feature patterns from a set of training images, and calculate respective probabilities of one feature pattern being followed by another feature pattern when analyzing an image to detect a face.

Example 4 may be example 3, wherein the lookup table generator may be configured to generate a feature pattern connectivity matrix based on the probabilities calculated, and wherein the lookup table generator is to further calculate an average of the probabilities for each row or each column.

Example 5 may be example 4, wherein the lookup table generator may be configured to further select a row (or a column) with the largest average of the probabilities among the rows (or columns) as a reference row (or column).

Example 6 may be example 5, wherein the lookup table generator may be further configured to store the feature patterns into the lookup table in accordance with the probabilities in the reference row or column.

Example 7 may be any one of examples 1-6, wherein the face detector may be configured to receive the image, generate a plurality of different scaled images, and scan the different scaled images using a scanning window to detect whether a face is present in the scanning window, based at least in part on the feature patterns stored in the lookup table loaded into the cache memory.

Example 8 may be example 7, wherein the face detector may be configured to determine whether there is a face in the image based at least in part on results of the scan.

Example 9 may be a computer-implemented method for computing, including detecting a face in an image. The method nay comprise: receiving an image, by a face detector of the computing device; generating, by the face detector, a plurality of different scaled images, based on the image received; scanning the different scaled images, by the face detector, using a scanning window to determine whether a face is present in the scanning window, based at least in part on feature patterns pre-stored in a lookup table loaded in a cache memory, accessing the lookup table during the scanning, wherein the feature patterns within the lookup table are organized within the lookup table in accordance with relative connectivity of the feature patterns; and determining, by the face detector, whether a face is present in the image based at least in part on results of the scanning.

Example 10 may be example 9, wherein relative connectivity of a first and a second feature pattern of the feature patterns may be measured by a score indicative of a likelihood of the first feature pattern is followed by the second feature pattern when analyzing an image to detect a face.

Example 10 may be example 9 or 10, further comprising: processing, by a lookup table generator operating on a computing device, a set of training images to identify the feature patterns to be pre-stored in the lookup table; determining, by the lookup table generator, relative connectivity of the feature patterns; and storing, by the lookup table generator, the feature patterns into the lookup table, in accordance with the relative connectivity of the feature patterns.

Example 12 may be example 11, wherein determining relative connectivity may comprise calculating respective probabilities of one feature pattern being followed by another feature pattern when analyzing an image to detect a face.

Example 13 may be example 12 wherein determining relative connectivity may further comprise generating a feature pattern connectivity matrix based on the probabilities calculated, and calculating an average of the probabilities for each row or each column.

Example 14 may be example 13, wherein determining relative connectivity may further comprise selecting a row (or a column) with the largest average of the probabilities among the rows (or columns) as a reference row (or column).

Example 15 may be example 14, wherein storing may comprise storing the feature patterns into the lookup table in accordance with the probabilities in the reference row or column.

Example 16 may be at least one computer-readable medium (CRM) comprising instructions to provide, in response to execution of the instructions by the computing apparatus, a face detector to: receive an image; generate a plurality of different scaled images, based on the image received; scan the different scaled images using a scanning window to determine whether a face is present in the scanning window, based at least in part on the feature patterns pre-stored in a lookup table loaded in a cache memory, accessing the lookup table during the scanning, wherein the feature patterns within the lookup table are organized within the lookup table in accordance with relative connectivity of the feature patterns; and determine whether a face is present in the image based at least in part on results of the scan.

Example 17 may be example 16, wherein relative connectivity of a first and a second feature pattern of the feature patterns is measured by a score indicative of a likelihood of the first feature pattern is followed by the second feature pattern when analyzing an image to detect a face.

Example 18 may be example 16, wherein the instructions may further provide a lookup table generator to: process a set of training images to identify the feature patterns; determine relative connectivity of the feature patterns; and store the feature patterns into the lookup table, in accordance with the relative connectivity of the feature patterns.

Example 19 may be example 18, wherein the lookup table generator may further generate the feature patterns from a set of training images, and calculate respective probabilities of one feature pattern being followed by another feature pattern when analyzing an image to detect a face.

Example 20 may be example 19, wherein the lookup table generator may further generate a feature pattern connectivity matrix based on the probabilities calculated, and wherein the lookup table generator is to further calculate an average of the probabilities for each row or each column.

Example 21 may be example 20, wherein the lookup table generator may further select a row (or a column) with the largest average of the probabilities among the rows (or columns) as a reference row (or column).

Example 17 may be example 21, wherein the lookup table generator may store the feature patterns into the lookup table in accordance with the probabilities in the reference row or column.

Example 23 may be an apparatus for computing, including detecting a face in an image. The apparatus may comprise: means for receiving an image; means for generating a plurality of different scaled images, based on the image received; and means for scanning the different scaled images for feature patterns pre-stored in the lookup table in a cache memory, wherein the feature patterns of the lookup table are organized in accordance with relative connectivity of the feature patterns.

Example 24 may be example 23, wherein relative connectivity of a first and a second feature pattern of the feature patterns is measured by a score indicative of a likelihood of the first feature pattern is followed by the second feature pattern when analyzing an image to detect a face.

Example 25 may be example 23, further comprising: means for processing a set of training images to identify the plurality of feature patterns; means for determining relative connectivity of the feature patterns; and means for storing the feature patterns into the lookup table, in accordance with the relative connectivity of the feature patterns.

Example 26 may be example 25, wherein means for processing may comprise means for generate the feature patterns from a set of training images, and calculating respective probabilities of one feature pattern being followed by another feature pattern when analyzing an image to detect a face.

Example 27 may be example 26, wherein means for determining relative connectivity may comprise means for generating a feature pattern connectivity matrix based on the probabilities calculated, and wherein the lookup table generator is to further calculate an average of the probabilities for each row or each column.

Example 28 may be example 27, wherein means for determining relative connectivity may further comprise means for selecting a row (or a column) with the largest average of the probabilities among the rows (or columns) as a reference row (or column).

Example 29 may be example 28, wherein means for storing may comprise means for storing the feature patterns into the lookup table in accordance with the probabilities in the reference row or column.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, including detecting a face in an image, the apparatus comprising:
   one or more processors;
   cache memory;
   a lookup table of feature patterns to be loaded into the cache memory, during operation, for use to detect whether a face is present in an image, wherein the lookup table has a plurality of rows and a plurality of columns of feature patterns, including a reference row or column of feature patterns, wherein non-reference feature patterns are stored into the lookup table in accordance with relative connectivity of the non-reference feature patterns to reference feature patterns of the reference row or column of the lookup table; and
   a face detector to be operated by the one or more processors to detect whether a face is present in an image, that uses the lookup table of feature patterns loaded into the cache memory during detection for the face.

2. The apparatus of claim 1, wherein relative connectivity of a first and a second feature pattern of the feature patterns is measured by a score indicative of a likelihood of the first feature pattern being followed by the second feature pattern when analyzing an image to detect a face.

3. The apparatus of claim 2, further comprising a lookup table generator to generate the feature patterns from a set of training images, and calculate respective probabilities of one feature pattern being followed by another feature pattern when analyzing an image to detect a face.

4. The apparatus of claim 3, wherein the lookup table generator is to generate a feature pattern connectivity matrix based on the probabilities calculated, and wherein the lookup table generator is to further calculate an average of the probabilities for each row or each column.

5. The apparatus of claim 4, wherein the lookup table generator is to further select a row (or a column) with the largest average of the probabilities among the rows (or columns) as a reference row (or column).

6. The apparatus of claim 5, wherein the lookup table generator is to store the feature patterns into the lookup table in accordance with the probabilities, relative to the reference row or column.

7. The apparatus of claim 1, wherein the face detector is to receive the image, generate a plurality of different scaled images, and scan the different scaled images using a scanning window to detect whether a face is present in the scanning window, based at least in part on the feature patterns stored in the lookup table loaded into the cache memory.

8. The apparatus of claim 7, wherein the face detector is to determine whether there is a face in the image based at least in part on results of the scan.

9. A computer-implemented method for computing, including detecting a face in an image, the method comprising:
receiving an image, by a face detector of the computing device;
generating, by the face detector, a plurality of different scaled images, based on the image received;
scanning the different scaled images, by the face detector, using a scanning window to determine whether a face is present in the scanning window, based at least in part on feature patterns pre-stored in a lookup table loaded in a cache memory, accessing the lookup table during the scanning, wherein the lookup table has a plurality of rows and plurality of columns of feature patterns, including a reference row or column of feature patterns, wherein the non-reference feature patterns are stored into the lookup table in accordance with relative connectivity of the non-reference feature patterns to the reference feature patterns of the reference row or column of the lookup table; and
determining, by the face detector, whether a face is present in the image based at least in part on results of the scanning.

10. The computer-implemented method of claim 9, wherein relative connectivity of a first and a second feature pattern of the feature patterns is measured by a score indicative of a likelihood of the first feature pattern being followed by the second feature pattern when analyzing an image to detect a face.

11. The computer-implemented method of claim 9, further comprising:
processing, by a lookup table generator operating on a computing device, a set of training images to identify the feature patterns to be pre-stored in the lookup table;
determining, by the lookup table generator, relative connectivity of the feature patterns; and
storing, by the lookup table generator, the feature patterns into the lookup table, in accordance with the relative connectivity of the feature patterns.

12. The method of claim 11, wherein determining relative connectivity comprises calculating respective probabilities of one feature pattern being followed by another feature pattern when analyzing an image to detect a face.

13. The method of claim 12 wherein determining relative connectivity further comprises generating a feature pattern connectivity matrix based on the probabilities calculated, and calculating an average of the probabilities for each row or each column.

14. The method of claim 13, wherein determining relative connectivity further comprises selecting a row (or a column) with the largest average of the probabilities among the rows (or columns) as a reference row (or column).

15. The method of claim 14, wherein storing comprises storing the feature patterns into the lookup table in accordance with the probabilities, and relative tom the reference row or column.

16. At least one non-transitory computer-readable medium (CRM) comprising instructions to provide, in response to execution of the instructions by the computing apparatus, a face detector to:
receive an image;
generate a plurality of different scaled images, based on the image received;
scan the different scaled images using a scanning window to determine whether a face is present in the scanning window, based at least in part on feature patterns pre-stored in a lookup table loaded in a cache memory, accessing the lookup table during the scanning, wherein the lookup table has a plurality of rows and a plurality of columns of feature patterns, including a reference row or column of feature patterns, wherein non-reference feature patterns within the lookup table are stored into the lookup table in accordance with relative connectivity of the non-reference feature patterns to reference feature patterns in the reference row or column; and
determine whether a face is present in the image based at least in part on results of the scan.

17. The non-transitory CRM of claim 16, wherein relative connectivity of a first and a second feature pattern of the feature patterns is measured by a score indicative of a likelihood of the first feature pattern being followed by the second feature pattern when analyzing an image to detect a face.

18. The non-transitory CRM of claim 16, wherein the instructions further provide a lookup table generator to:
process a set of training images to identify the feature patterns;
determine relative connectivity of the feature patterns; and
store the feature patterns into the lookup table, in accordance with the relative connectivity of the feature patterns.

19. The non-transitory CRM of claim 18, wherein the lookup table generator is to further generate the feature patterns from a set of training images, and calculate respective probabilities of one feature pattern being followed by another feature pattern when analyzing an image to detect a face.

20. The non-transitory CRM of claim 19, wherein the lookup table generator is to generate a feature pattern connectivity matrix based on the probabilities calculated, and wherein the lookup table generator is to further calculate an average of the probabilities for each row or each column.

21. The non-transitory CRM of claim 20, wherein the lookup table generator is to further select a row (or a column) with the largest average of the probabilities among the rows (or columns) as a reference row (or column).

22. The non-transitory CRM of claim 21, wherein the lookup table generator is to store the feature patterns into the lookup table in accordance with the probabilities, and relative to the reference row or column.

* * * * *